(12) United States Patent
Austin et al.

(10) Patent No.: US 11,975,609 B1
(45) Date of Patent: May 7, 2024

(54) SYSTEMS AND METHODS FOR SELECTIVE STEERING WHEEL TRANSPARENCY AND CONTROL OF THE SAME

(71) Applicant: Toyota Motor Engineering & Manufacturing North America, Inc., Plano, TX (US)

(72) Inventors: Benjamin Piya Austin, Saline, MI (US); John K. Lenneman, Okemos, MI (US); George M. Evans, Ann Arbor, MI (US); Takeshi Yoshida, Ann Arbor, MI (US); William Patrick Garrett, Plymouth, MI (US); Rebecca L Kirschweng, Whitmore Lake, MI (US)

(73) Assignees: Toyota Motor Engineering & Manufacturing North America Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/144,439

(22) Filed: May 8, 2023

(51) Int. Cl.
*B60K 35/00* (2006.01)
*G06F 3/01* (2006.01)
*G09G 3/00* (2006.01)

(52) U.S. Cl.
CPC .............. *B60K 35/00* (2013.01); *G06F 3/013* (2013.01); *G09G 3/001* (2013.01); *B60K 2370/184* (2019.05); *B60K 2370/52* (2019.05); *B60K 2370/66* (2019.05); *B60K 2370/736* (2019.05); *B60K 2370/741* (2019.05);
(Continued)

(58) Field of Classification Search
CPC ................ B60K 35/00; B60K 2370/52; B60K 2370/66; B60K 2370/184; B60K 2370/736; B60K 2370/741; B60K 2370/782; G06F 3/013; G09G 3/001; G09G 2320/0613; G09G 2354/00; G09G 2380/10
USPC ......................................................... 345/156
See application file for complete search history.

(56) References Cited

U.S. PATENT DOCUMENTS 10,040,352 B2 * 8/2018 Bostick .................. B62D 1/046
10,613,810 B2   4/2020 Wakamoto et al.
(Continued)

FOREIGN PATENT DOCUMENTS

DE   102012010125 A1   12/2012
JP       61150866 A     7/1986
(Continued)

*Primary Examiner* — Jason M Mandeville
(74) *Attorney, Agent, or Firm* — Dinsmore & Shohl LLP

(57) ABSTRACT

Embodiments herein are directed to a transparent steering wheel system for a vehicle that includes a sensor system, a projection system, and an electronic control unit. The electronic control unit is configured to determine when a plurality of display data displayed on a display device behind a steering wheel is blocked by the steering wheel from a field of view of a driver, determine when a desirable notification is included in the plurality of display data, and when the desirable notification is included and the field of view of the desirable notification for the driver is blocked by the steering wheel, control the projection system to project the desirable notification onto the projection surface of the steering wheel that fully covers the steering wheel such that the steering wheel appears to be transparent when the desirable notification is displayed onto the projection surface.

20 Claims, 8 Drawing Sheets

(52) U.S. Cl.
CPC ............... *B60K 2370/782* (2019.05); *G09G 2320/0613* (2013.01); *G09G 2354/00* (2013.01); *G09G 2380/10* (2013.01)

(56) References Cited

U.S. PATENT DOCUMENTS

| | | | | |
|---|---|---|---|---|
| 2012/0287050 | A1* | 11/2012 | Wu | G06F 3/04886 345/168 |
| 2017/0291493 | A1* | 10/2017 | Bostick | B60Q 9/00 |
| 2019/0278097 | A1* | 9/2019 | Sun | G09G 3/001 |
| 2020/0192466 | A1* | 6/2020 | Vai | G06F 3/0425 |
| 2021/0197845 | A1* | 7/2021 | Mimura | B60W 60/005 |
| 2022/0024382 | A1 | 1/2022 | Kozono | |

FOREIGN PATENT DOCUMENTS

| | | |
|---|---|---|
| JP | 2013033344 A | 2/2013 |
| KR | 101857283 B1 | 5/2018 |

\* cited by examiner

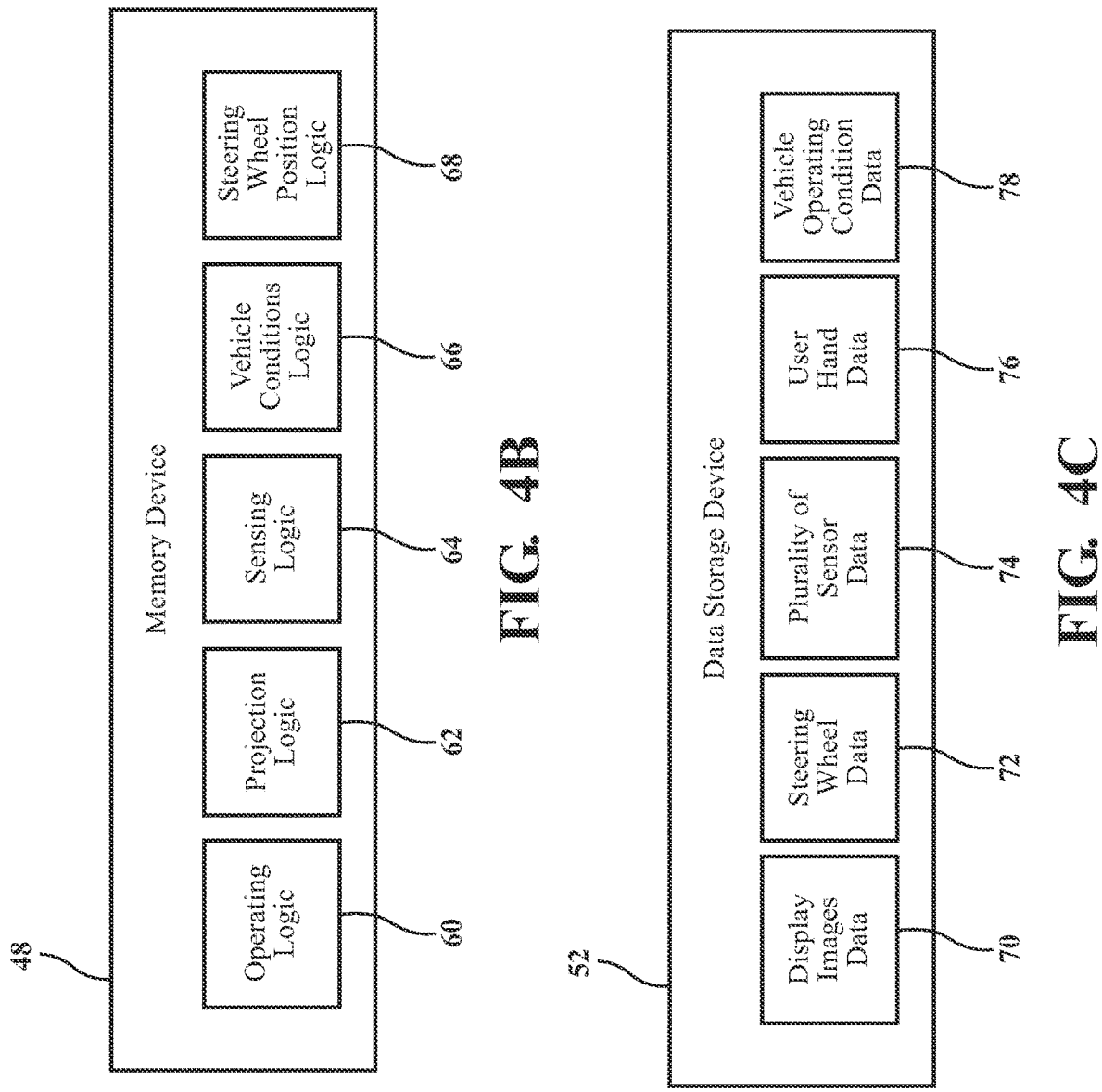

SYSTEMS AND METHODS FOR SELECTIVE STEERING WHEEL TRANSPARENCY AND CONTROL OF THE SAME

TECHNICAL FIELD

The present specification generally relates to systems and methods for a transparent steering wheel for a vehicle and, more specifically, to systems and methods for selectively making the steering wheel temporarily transparent.

BACKGROUND

Vehicles are generally equipped with a steering wheel. It is known that steering wheels and users hands thereon occlude views of important vehicle components, such as an instrument cluster display or a head-up display. Known conventional systems make the steering wheel constantly transparent. Such constant transparency does not alert the driver of undesirable notifications or information.

SUMMARY

In one embodiment, a steering wheel selective transparency system for a vehicle, the vehicle including a passenger compartment, a steering wheel having a projection surface, and a plurality of display data displayed on a display device positioned behind the steering wheel is provided. The system includes a sensor system positioned in the passenger compartment, a projection system positioned in the passenger compartment, and an electronic control unit communicatively coupled to the sensor system and the projection system. The electronic control unit includes at least one processing device and a memory device coupled to the at least one processing device. The memory device stores logic that, when executed by the at least one processing device, causes the electronic control unit to determine when the plurality of display data displayed on the display device behind the steering wheel is blocked by the steering wheel from a field of view of a driver, determine when a desirable notification is included in the plurality of display data displayed on the display device, and when the desirable notification is included in the plurality of display data displayed on the display device and the field of view of the desirable notification for the driver is blocked by the steering wheel, control the projection system to project the desirable notification onto the projection surface of the steering wheel that fully covers the steering wheel such that the steering wheel appears to be transparent when the desirable notification is displayed onto the projection surface.

In another embodiment, a method of selectively making a steering wheel transparent. The method incudes the steps of determining, by an electronic control unit, when a plurality of display data displayed on a display device behind the steering wheel is blocked by the steering wheel from a field of view of a driver, determining, by the electronic control unit, when a desirable notification is included in the plurality of display data displayed on the display device, and when the desirable notification is included in the plurality of display data displayed on the display device and the field of view of the desirable notification for the driver is blocked by the steering wheel, controlling, by the electronic control unit, a projection system to project the desirable notification onto a projection surface of the steering wheel that fully covers the steering wheel such that the steering wheel appears to be transparent when the desirable notification is displayed onto the projection surface.

In yet another embodiment, a steering wheel selective transparency system for a vehicle is provided. The system includes a steering wheel having a projection surface, a plurality of display data displayed on a display device positioned behind the steering wheel, a sensor system, a projection system, and an electronic control unit. The sensor system has at least one first sensor configured for sensing a position of the steering wheel and at least one second sensor configured for sensing the plurality of display data displayed on the display device. The electronic control unit is communicatively coupled to the sensor system and the projection system. The electronic control unit configured to determine when the plurality of display data displayed on the display device behind the steering wheel is blocked by the position of the steering wheel from a field of view of a driver sensed by the at least one first sensor, determine when a desirable notification is included in the plurality of display data displayed on the display device, and when the desirable notification is included in the plurality of display data displayed on the display device and the field of view of the desirable notification for the driver is blocked by the steering wheel, control the projection system to project the desirable notification, sensed by the at least one second sensor, onto the projection surface of the steering wheel that fully covers the steering wheel such that the steering wheel appears to be transparent when the desirable notification is displayed onto the projection surface.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4B schematically depicts an illustrative memory component containing illustrative logic components according to one or more embodiments shown and described herein;

FIG. 4C schematically depicts an illustrative data storage device containing illustrative data components according to one or more embodiments shown and described herein.

DETAILED DESCRIPTION

Embodiments described herein are generally directed to a steering wheel selective transparency system that selectively projects images onto a steering wheel so that the steering wheel appears to be invisible or transparent when desirable notifications would be occluded by the steering wheel, and/or arms, and/or hands of a driver. The steering wheel transparency system includes a steering wheel, a sensor system, a projection system, and memory with logic modules for selectively projecting images onto the steering wheel so that the steering wheel appears to be invisible or transparent when a desirable notification, such as an important and/or urgent notification is displayed behind the steering wheel that the driver needs to see. As such, the projection of the image appears to make the steering wheel transparent such that the display data displayed on a meter unit or head-up display is now selectively visible to the driver.

The projection system is located in the cabin of the vehicle and is configured to display images of the view behind the steering wheel to the driver. The view occluded by the steering wheel, and/or arms, and/or hands of the driver is selectively projected onto the steering wheel using imaging sensors, projectors, and the like. The projection system communicates with the imaging sensors to output the images captured by at least one sensor onto a projection surface of the steering wheel. The system uses the precise dimensions of the steering wheel along with the current position of the steering wheel, and/or arms, and/or hands of the driver to project the images in a manner that fully covers the steering wheel and may cover the arms and/or hands of the driver and/or may project around the current position of the arms and/or hands of the driver. As such, even if the driver is actively turning the steering wheel, the images will be projected in a manner that makes the steering wheel appear invisible or transparent. Further, the projection system may project images around the hand positions of the driver so that the driver can continue to keep their hands at a desired position even when images are projected onto the steering wheel.

The phrase "communicatively coupled" is used herein to describe the interconnectivity of various components of the steering wheel selective transparency system for selectively making the steering wheel transparent to the driver means that the components are connected either through wires, optical fibers, or wirelessly such that electrical, optical, and/or electromagnetic signals may be exchanged between the components. It should be understood that other means of connecting the various components of the system not specifically described herein are included without departing from the scope of the present disclosure.

Figure 1:
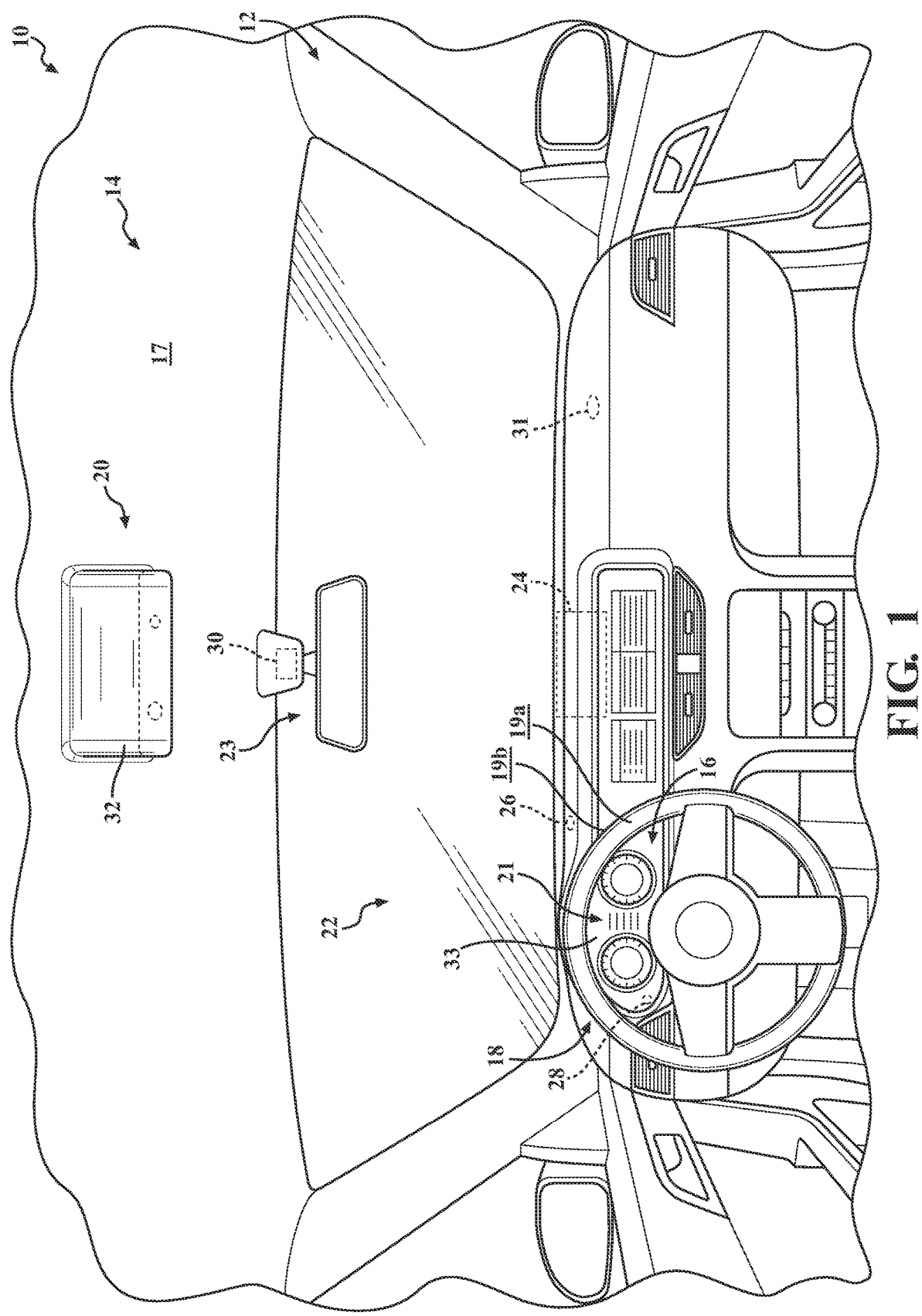
FIG. 1 schematically depicts a partial environmental view of a vehicle including a steering wheel selective transparency system according to one or more embodiments shown and described herein.

Referring initially to the drawings, FIG. 1 depicts a partial environmental view of a passenger compartment 12 of a vehicle 10. It should be understood that the vehicle 10 includes a vehicle body onto which a vehicle drivetrain is coupled and the passenger compartment 12 is integral with the vehicle body. The passenger compartment 12 generally defines a passenger cabin of the vehicle 10. The vehicle 10 may further include a steering wheel selective transparency system 14, an instrument panel 16 that includes a meter unit 33 and/or a head-up display configured to display a plurality of display data 21, an interior roof surface 17, a rear view mirror 23, and a steering wheel 18. The steering wheel 18 may include an exterior surface 19a that faces the driver and an interior surface 19b that faces the instrument panel 16. For the purposes of describing where images are displayed on the steering wheel 18 discussed herein, the exterior surface 19a may be referred to as a projection surface and includes an exterior surface or surface of components that generally face the driver of the vehicle 10 such as horn button(s), spokes, wheel, driver toggle switches (e.g., volume control, radio station controls, phone or HUD controls, and the like), airbag, other display devices, and the like, as discussed in greater detail herein.

As such, the vehicle 10 may generally be any vehicle (e.g., motor vehicle, hybrid, recreational, partial autonomous, off-road, boat, airplane, and/or the like) that includes the steering wheel selective transparency system 14, which may further include a projection system 20, a sensing system 22 and one or more vehicle onboard computing devices, such as an electronic control unit 24 that contains hardware for processing data, storing data, displaying data, and detecting operating conditions of the vehicle 10, as discussed in greater detail herein. Thus, the steering wheel selective transparency system 14 of the vehicle 10 and/or components thereof may perform one or more computing functions, such as determining the current position of the steering wheel 18, and/or arms 36, and/or hands 38 of a driver positioned on the steering wheel 18, receiving inputs indicative of the information or data displayed as the plurality of display data 21, determining when desirable notifications would be occluded by the steering wheel 18 and/or the arms 36, and/or the hands 38 of the driver, and the like.

Figure 3A:
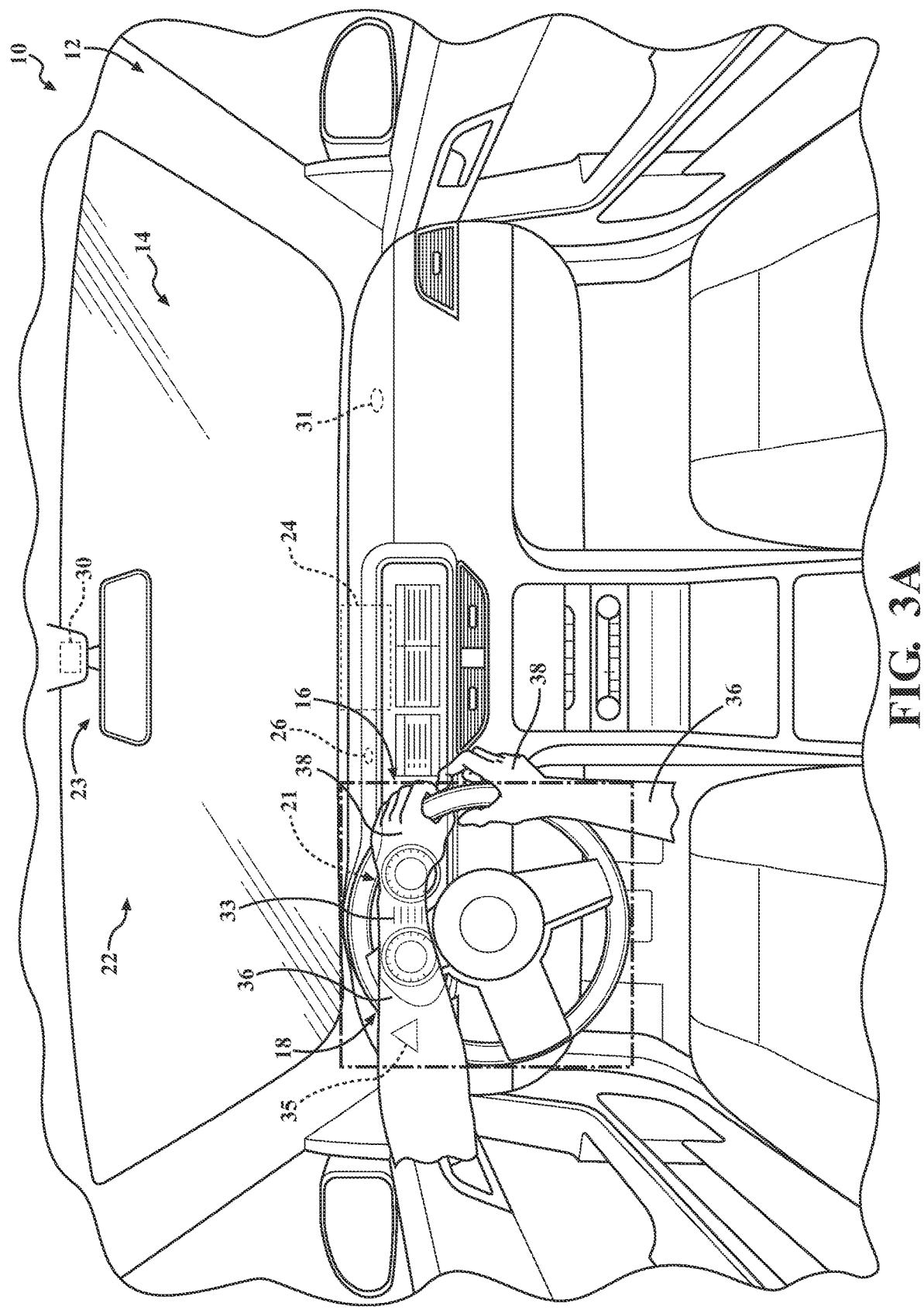
FIG. 3A schematically depicts a partial environmental view of the vehicle of FIG. 1 with a plurality of display data occluded by the steering wheel and arm of a driver according to one or more embodiments shown and described herein.
Figure 3B:
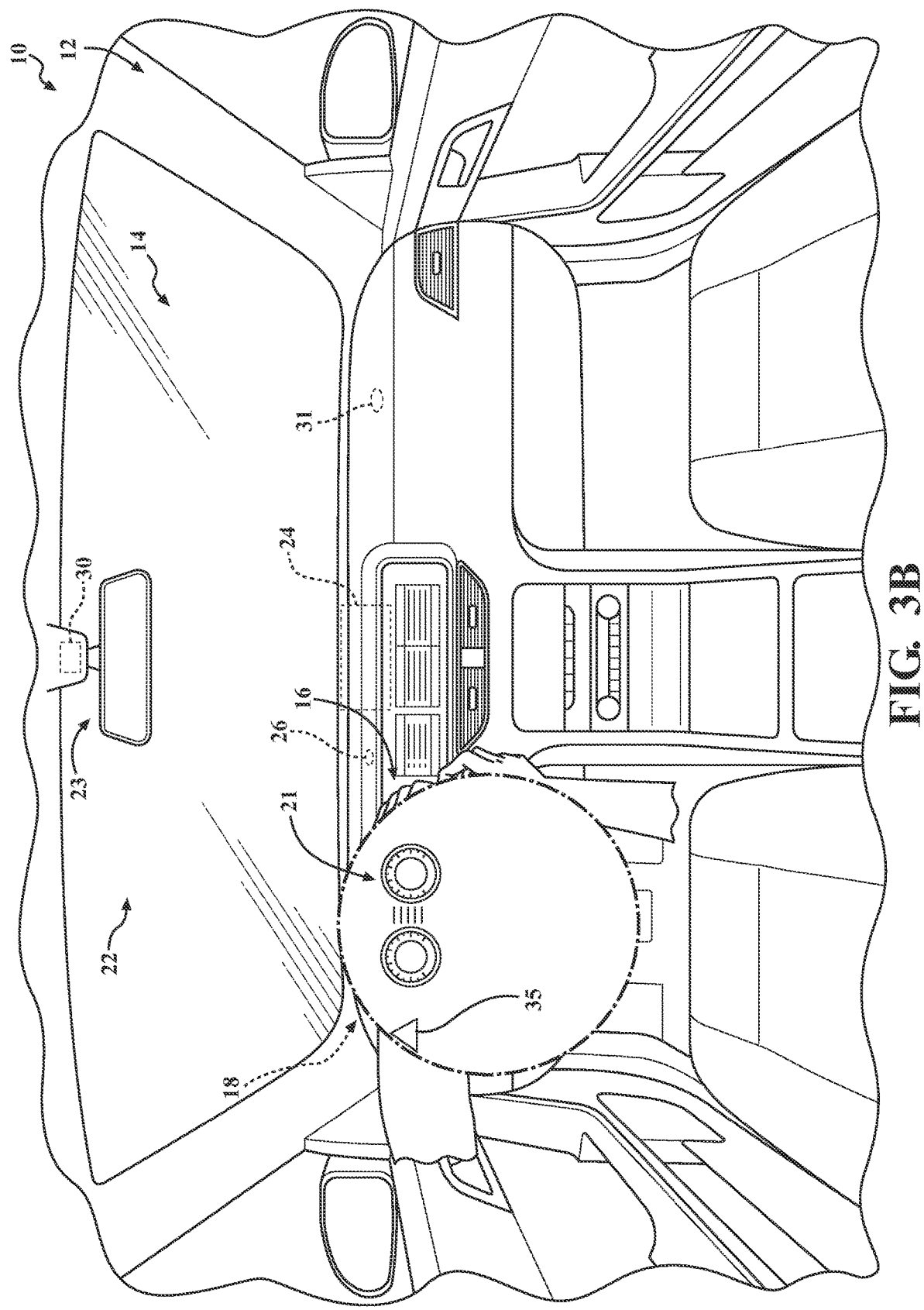
FIG. 3B schematically depicts the partial environmental view of the vehicle of FIG. 3A with the plurality of display data projected by the steering wheel selective transparency system in a first aspect onto a projection surface of the steering wheel according to one or more embodiments shown and described herein.
Figure 3C:
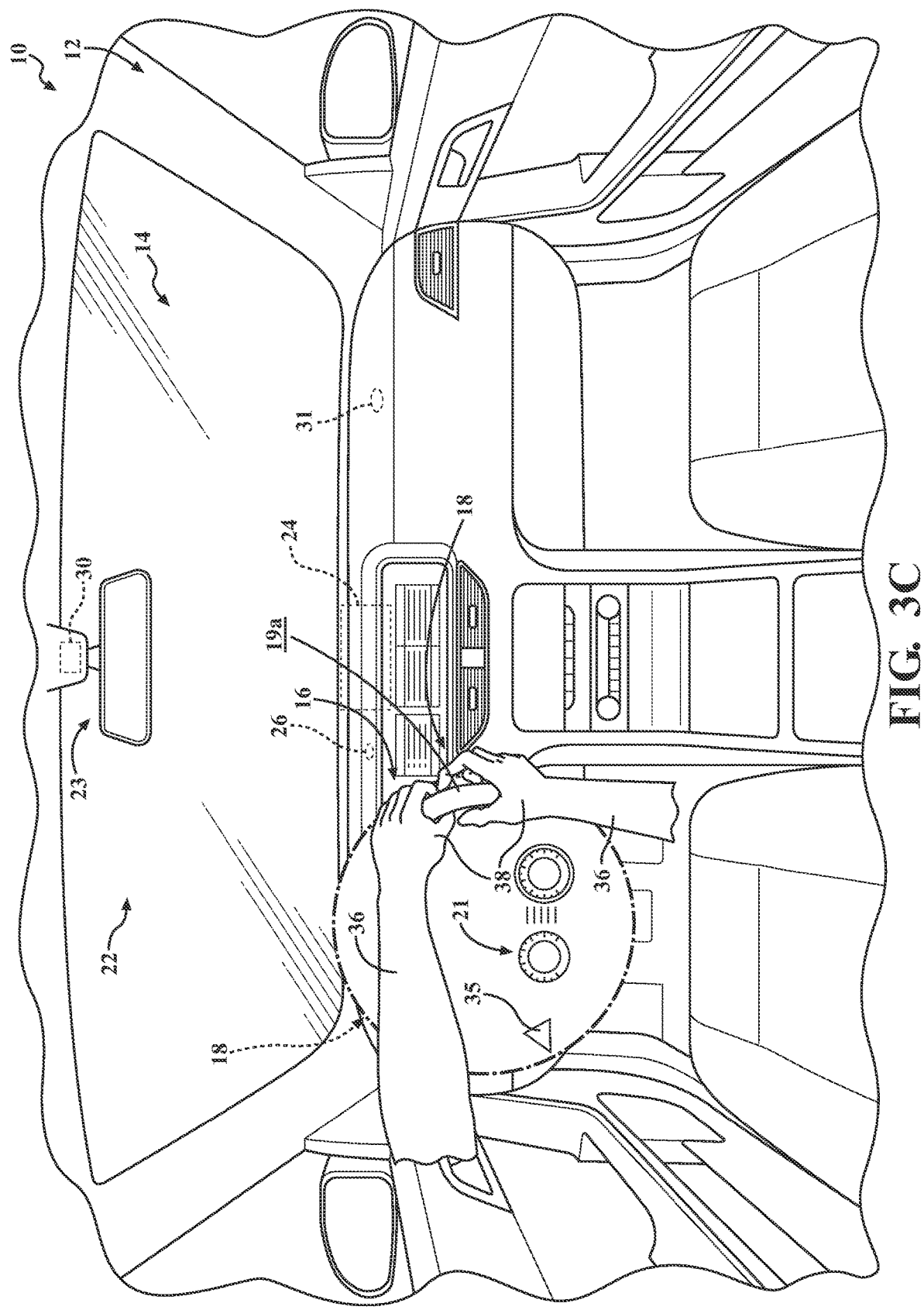
FIG. 3C schematically depicts the partial environmental view of the vehicle of FIG. 3A with the plurality of display data projected by the steering wheel selective transparency system in a second aspect onto the projection surface of the steering wheel around the arm of the driver such that the driver may still visualize the steering wheel according to one or more embodiments shown and described herein.

Now referring to FIGS. 1 and 3A-3C, the vehicle 10 and/or components thereof (e.g., the steering wheel selective transparency system 14, the electronic control unit 24, and the like) may perform one or more additional computing functions, such as controlling the projection system 20 and components thereof, in some embodiments, to project or display images indicative of the plurality of display data 21 onto the exterior surface 19a of the steering wheel 18, as best illustrated in FIG. 3B, and/or around the arms 36 and/or hands 38 of the driver, as best illustrated in FIG. 3C, and as described in greater detail herein. In other aspects, the steering wheel selective transparency system 14 and/or the electronic control unit 24 may control the projection system 20 and components thereof, to project or display images indicative of the plurality of display data 21 onto the arms 36 and/or hands 38 of the driver, onto objects, and the like, as described in greater detail herein. Further, in some embodiments, only the portions of the steering wheel 18, and/or the arms 36, and/or hands 38 that are actually occluding the desirable notifications or other display data would receive the projection data to selectively project or display images indicative of the plurality of display data 21 to the driver, as discussed in greater detail herein.

The sensing system 22 may include at least one sensor 26 configured for sensing the position of the steering wheel 18 and/or position of the arms 36 and/or hands 38 of the driver positioned on the steering wheel 18. In some aspects, the sensing system 22 may further include at least one sensor 28 configured for sensing the plurality of display data 21 displayed on the meter unit 33 and/or the head-up display that may occasionally be occluded by the steering wheel 18 and/or arms 36, and/or hands 38 of the driver. Further, in some aspects, the sensing system 22 may include at least one sensor 30 configured for sensing a gaze of the driver. As such, the at least one sensor 26 configured for sensing the position of the steering wheel 18 and/or position of the arms 36, and/or hands 38 of the driver positioned on the steering wheel 18, the at least one sensor 28 configured for sensing the plurality of display data 21 displayed on the meter unit 33 and/or the head-up display, and the at least one sensor 30 configured to determine the gaze of the driver may each be an image capturing device, a scanning device, and/or the like.

The image capturing device may capture images in real-time and may be any imaging device, sensor, or detector that is suitable for obtaining images. That is, the image capturing device may incorporate one or more image sensors, one or more image processors, one or more optical elements, and/or the like. In some embodiments, the image capturing device may capture high dynamic range (HDR) images. In some embodiments, the image capturing device may capture a plurality of images successively (e.g., "burst mode" capture), may capture single images at particular intervals, and/or may capture motion images (e.g., video capture). That is, as used herein, the term "images" or "image" refers to video images (i.e., a sequence of consecutive images), still images (including still images isolated from video images), and/or image data.

Still referring to FIGS. 1 and 3A-3C, in some embodiments, images are continuously captured and analyzed. In other embodiments, images are captured at particular intervals, illustrative intervals may include, but are not limited to, time intervals such as every second, every 2 seconds, every 3 seconds, every 4 seconds, every minute, every 2 minutes, every 5 minutes, every 30 minutes, every hour, or the like. Other intervals are vehicle condition based such as when a desirable notification is displayed that the driver cannot see due to the position of the steering wheel 18 and/or hands of the driver. In addition to capturing images, the image capturing device may record information regarding the image capture, such as, for example, a time stamp of when the image was captured, a frame rate, a field of view, and/or the like. Each captured image and the recorded information may be transmitted as image data to the electronic control unit 24.

In some embodiments, the image capturing device may be capable of focusing on a target object, zooming in and out, and/or moving, such as, for example, panning, tilting, and/or the like. In some embodiments, the image capturing device may be capable of tracking a moving object, such as, for example, the steering wheel 18, the eyes or head of the driver, and/or the like. As such, the image capturing device may incorporate various motion sensing and/or tracking components, software, and/or the like that are generally understood as providing tracking capabilities. In some embodiments, movement of the imaging device may be remotely controlled by a user.

Further, the image capturing device may include or may be coupled to a lens. The lens is not limited by this disclosure and may generally be any optical component that is configured to focus the light entering the image capturing device such that an image can be properly obtained. In some embodiments, the lens may be a fixed lens that is not adjustable. In other embodiments, the lens may be adjustable, either manually or automatically by the electronic control unit 24 of the vehicle 10, to zoom in on an object, zoom out on an object, and/or adjust the focus of the light entering the image capturing device Any suitable commercially available image capturing device may be used without departing from the scope of the present disclosure. In some embodiments, the image capturing device may also be coupled to one or more other components that provide additional functionality for imaging, such as, for example, one or more sensors.

Further, while FIGS. 1 and 3A-3C depict a single image capturing device for each of the at least one sensor 26 configured for sensing the position of the steering wheel 18 and/or position of the arms 36, and/or hands 38 of the driver positioned on the steering wheel 18, the at least one sensor 28 configured for sensing the plurality of display data 21 displayed on the meter unit 33 and/or the head-up display, and the at least one sensor 30 configured to determine the gaze of the driver may each be an image capturing device, it should be understood that any number of image capturing devices may be used without departing from the scope of the present disclosure. For example, the image capturing device may be a plurality of imaging devices arranged to capture an image in tandem, such as, for example, to capture a larger field of view than what would be possible with a single image capturing device or to capture a plurality of different angles of the same field of view.

The image capturing device is not limited by this disclosure, and may generally be any device that captures images. That is, any suitable commercially available image capturing device may be used without departing from the scope of the present disclosure.

Still referring to FIGS. 1 and 3A-3C, the electronic control unit 24 may be configured to receive the image data from the at least one sensor 26 configured for sensing the position of the steering wheel 18 and/or position of the arms 36, and/or hands 38 of the driver positioned on the steering wheel 18, the at least one sensor 28 configured for sensing the plurality of display data 21 displayed on the meter unit 33 and/or the head-up display, and the at least one sensor 30 configured to determine the gaze of the driver may each be an image capturing device, process the image data to determine whether the image data to determine whether the desirable notification is occluded or blocked from the driver, the information and/or data that needs to be projected onto the steering wheel 18, the position of the hands of the driver to project around them, and to determine whether the driver has viewed or engaged with projection of the data onto the exterior surface 19a of the steering wheel 18, as discussed in greater detail herein.

As such, the at least one sensor 30 configured to determine the gaze of the driver may be configured to sense and output a gaze of the driver to the electronic control unit 24 as a gaze data, where an analysis of the gaze data may be performed to determine whether the gaze of the driver is determined to have looked at the projected image. In other embodiments, the gaze of the driver may be analyzed to determine whether the gaze at the projected image exceeds a predetermined amount of time threshold and/or whether the gaze of the driver at the projected image is a reengagement exceeding a predetermined number of times that a gaze of the driver returns to the projected image, as discussed in greater detail herein.

In some aspects, the at least one sensor 30 may be positioned within, integrally formed with (as a monolithic single structure), or coupled to the rear view mirror 23, or portions thereof. In other aspects, the at least one sensor 30 may be positioned anywhere in the vehicle 10 to sense a gaze of the driver, such as without limitation, the windshield, the instrument panel 16, the steering wheel 18, the interior roof surface 17, and the like.

Further, the at least one sensor 30 configured to determine the gaze of the driver is not limited by this disclosure, and may generally be any device that captures images, detects eye gaze of the driver, and/or the like, and transmits the obtained gaze data to the electronic control unit 24. Any suitable commercially available gaze sensor may be used without departing from the scope of the present disclosure.

Further, in some embodiments, the at least one sensor 30 may be coupled to or configured to work in conjunction with a head tracker configured to sense and transmit positional movements and locations of the head of the driver. Such a combination may provide an accuracy to estimate what the driver is looking at.

In some embodiments, as described in greater detail herein, the at least one sensor 30 configured to determine the gaze of the driver may be a sensor that incorporates one or more image sensors, one or more image processors, one or more optical elements, and/or the like. The at least one sensor 30 configured to determine the gaze of the driver may generally be used to sense the movement or gaze of the eyes and/or pupils of the driver of the vehicle 10 so as to provide feedback during operation. As such, the at least one sensor 30 configured to determine the gaze of the driver be communicatively coupled to the electronic control unit 24 to transmit a plurality of outputs, either wired or wirelessly, to the electronic control unit 24, as explained in greater detail herein. For example, the driver may move his or her gaze up or down as he or she drives to look at the projected images when the data displayed behind the steering wheel 18 is occluded or blocked by the steering wheel 18 and/or of the arms 36 and/or hands 38 of the driver, and the steering wheel selective transparency system 14 may track a direction of the gaze of the driver using, for example, the at least one sensor 30. In other embodiments, the at least one sensor 30 configured to determine the gaze of the driver may not be an image capturing device, but may be a laser-based sensor, a proximity sensor, a level detection sensor, a pressure sensor, any combination thereof, and/or any other type of sensor that one skilled in the art may appreciate.

While FIGS. 1 and 3A-3C depict at least one sensor 30 configured to determine the gaze of the driver, it should be understood that any number of gaze sensors may be used without departing from the scope of the present disclosure. For example, the at least one sensor 30 configured to determine the gaze of the driver may be a plurality of gaze sensors arranged to capture gazes of each occupant within the vehicle 10 in tandem, such as, for example, to capture a larger field of view than what would be possible with the at least one sensor 30 configured to determine the gaze of the driver or to capture a plurality of different angles of the same field of view.

Still referring to FIGS. 1 and 3A-3C, in some embodiments, the at least one sensor 26 configured for sensing the position of the steering wheel 18 and/or position of the arms 36 and/or hands 38 of the driver positioned on the steering wheel 18, the at least one sensor 28 configured for sensing the plurality of display data 21 displayed on the meter unit 33 and/or the head-up display, and the at least one sensor 30 configured to determine the gaze of the driver may be integrated with the electronic control unit 24 (e.g., a component of the electronic control unit 24).

In other embodiments, the at least one sensor 26 configured for sensing the position of the steering wheel 18 and/or position of the arms 36 and/or hands 38 of the driver positioned on the steering wheel 18, the at least one sensor 28 configured for sensing the plurality of display data 21 displayed on the meter unit 33 and/or the head-up display, and the at least one sensor 30 configured to determine the gaze of the driver may be a standalone device that is separate from the electronic control unit 24.

For example, the at least one sensor 26 configured for sensing the position of the steering wheel 18 and/or position of the arms 36 and/or hands 38 of the driver positioned on the steering wheel 18 may be positioned within the instrument panel 16, within the projection system 20 coupled to or otherwise attached to the interior roof surface 17, or any other position within or coupled to any component of the vehicle 10. The at least one sensor 28 configured for sensing the plurality of display data 21 displayed on the meter unit 33 and/or the head-up display may be positioned within the instrument panel 16, within the projection system 20 coupled to or otherwise attached to the interior roof surface 17, or any other position within or coupled to any component of the vehicle 10.

In some embodiments, the at least one sensor 26 configured for sensing the position of the steering wheel 18 and/or position of the arms 36 and/or hands 38 of the driver positioned on the steering wheel 18, the at least one sensor 28 configured for sensing the plurality of display data 21 displayed on the meter unit 33 and/or the head-up display, and the at least one sensor 30 configured to determine the gaze of the driver and the electronic control unit 24 may be combined into a single unit that is integrated within the vehicle 10.

Still referring to FIGS. 1 and 3A-3C, in some embodiments, the sensing system 22 may further include at least one sensor 31 for monitoring vehicle conditions for urgent or other undesirable conditions that would result in a desirable notification 35 that may be displayed as the plurality of display data 21 or separately as a standalone notification or message that may become occluded or blocked from view of the driver by the steering wheel 18 and/or the arms 36, and/or hands 38 of the driver, and the like. While FIGS. 1 and 3A-3C depict the at least one sensor 31 as a single sensor configured to monitor vehicle conditions, it should be understood that any number of sensors may be used without departing from the scope of the present disclosure. Further, the at least one sensor 31 may be positioned within the instrument panel 16, within the projection system 20 coupled to or otherwise attached to the interior roof surface 17, or any other position within or coupled to any component of the vehicle 10.

Figure 2:
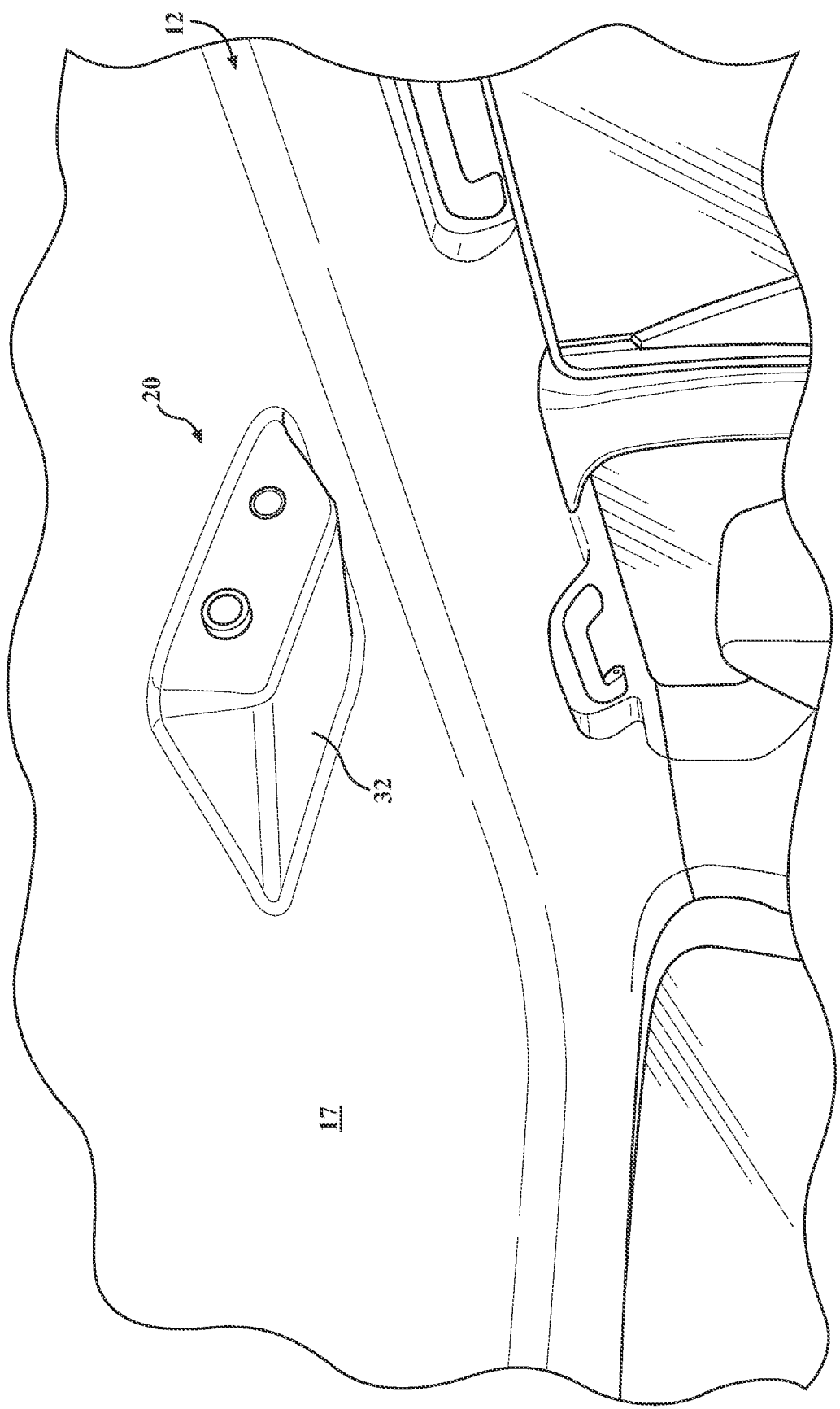
FIG. 2 schematically depicts a partial roof view of the vehicle of FIG. 1 including a projection system of the steering wheel selective transparency system according to one or more embodiments shown and described herein.

Now referring to FIGS. 1-2, the projection system 20 may include a projector 32. The projector 32 may be any device capable of transforming a data signal into an optical output, such as an image to be projected on a surface, for example, the projection surface of the exterior surface 19a of the steering wheel 18. That is, the projector 32 may be mounted to the interior roof surface 17 and trained onto the steering wheel 18 of the vehicle 10. This is non-limiting and the projector 32 may be trained onto any other surface of the vehicle 10. The image projected may be any of text, graphic images or video images such as pictures, video clips or movies.

In some embodiments, the projector 32 may include one or more processors and one or more memories that may store images as sensed and provided by the at least one sensor 28. In other embodiments, the projector 32 may omit a processor and/or a memory and the electronic control unit 24 may be used to store and transmit the image data for display. In some embodiments, the projector 32 may be a compact, low-power projector, such as a pico projector, a pico-laser projector, a micro projector, and/or the like.

In some embodiments, the projector 32 and/or the projection system 20 is configured to determine, analyze, and/or receive information and data regarding any curved surfaces (i.e., the exterior surface 19a of the steering wheel 18) such that the image projected appears to look flat to the driver from the eye point/viewpoint of the driver. As such, this analysis and projection occurs in real-time as objects may be continuously or intermittently moving (e.g., steering wheel 18, arms 36, hands 38, objects, and/or the like)

Referring back to FIGS. 1 and 3A-3C, in some embodiments, the projection surface of the exterior surface 19a of the steering wheel 18 may be coated with a projection film to selectively transform the steering wheel 18, or portions thereof, into semi-opaque projection screen for projector 32, whereby visually projected images may be projected onto the steering wheel 18 to selectively make the steering wheel 18 transparent such that the driver may see the blocked information by the steering wheel 18 and/or arms 36, and/or hands 38 of the driver that is otherwise displayed behind the steering wheel 18. In other embodiments, the steering wheel 18 may be formed with a suitable projection material embedded therewithin. In other embodiments, the projection surface of the steering wheel 18 is a deployable film or other material that may be rollably mounted and attached to the steering wheel 18 such that deployment of deployable projection film is achieved by unrolling thereof prior to projection. In other embodiments, the steering wheel 18 may include, or alternatively, or in combination with, embedded with an activatable projection film operative to transform the steering wheel 18 into a projection screen for the projector 32.

In other embodiments, the arms 36 and/or hands 38 of the driver may include sleeves and/or gloves, respectively, that are formed with, formed from, and/or coated with the projection film to selectively transform the arms 36 and/or hands 38, or portions thereof, into semi-opaque projection screen for projector 32, whereby visually projected images may be projected onto the arms 36 and/or hands 38, or portions thereof, resulting in a high-fidelity projection image.

In other embodiments, the steering wheel 18 (or components thereof) may be a digital display configured to display the data that would otherwise be displayed on the meter unit 33 and/or the head-up display indicative of the plurality of display data 21. As such, rather than the projection surface of the exterior surface 19a or in addition to the projection surface of the exterior surface 19a may include at least one display surface that may be integrated into, and/or coupled to the exterior surface 19a of the steering wheel 18 to display data and/or images. Further, in other embodiments, the data received by the steering wheel 18 may be from a rear-projection unit configured to receive, gather and/or transmit data to the digital display of the steering wheel 18.

In other embodiments, the projected data disclosed herein is not limited to the projection surface of the exterior surface 19a of the steering wheel 18 or to the display devices of the steering wheel 18 and instead may also be configured to be display or projected onto objects that may be temporarily on or in front of the steering wheel 18. As such, objects positioned between the driver and the steering wheel 18 that occlude portions of either the steering wheel 18 or the meter unit 33 may have projections cast onto a surface of the object, or the portions that are occluding the steering wheel 18 or the meter unit 33 to display the plurality of display data 21 displayed on the meter unit 33 and/or the head-up display.

Figure 4A:
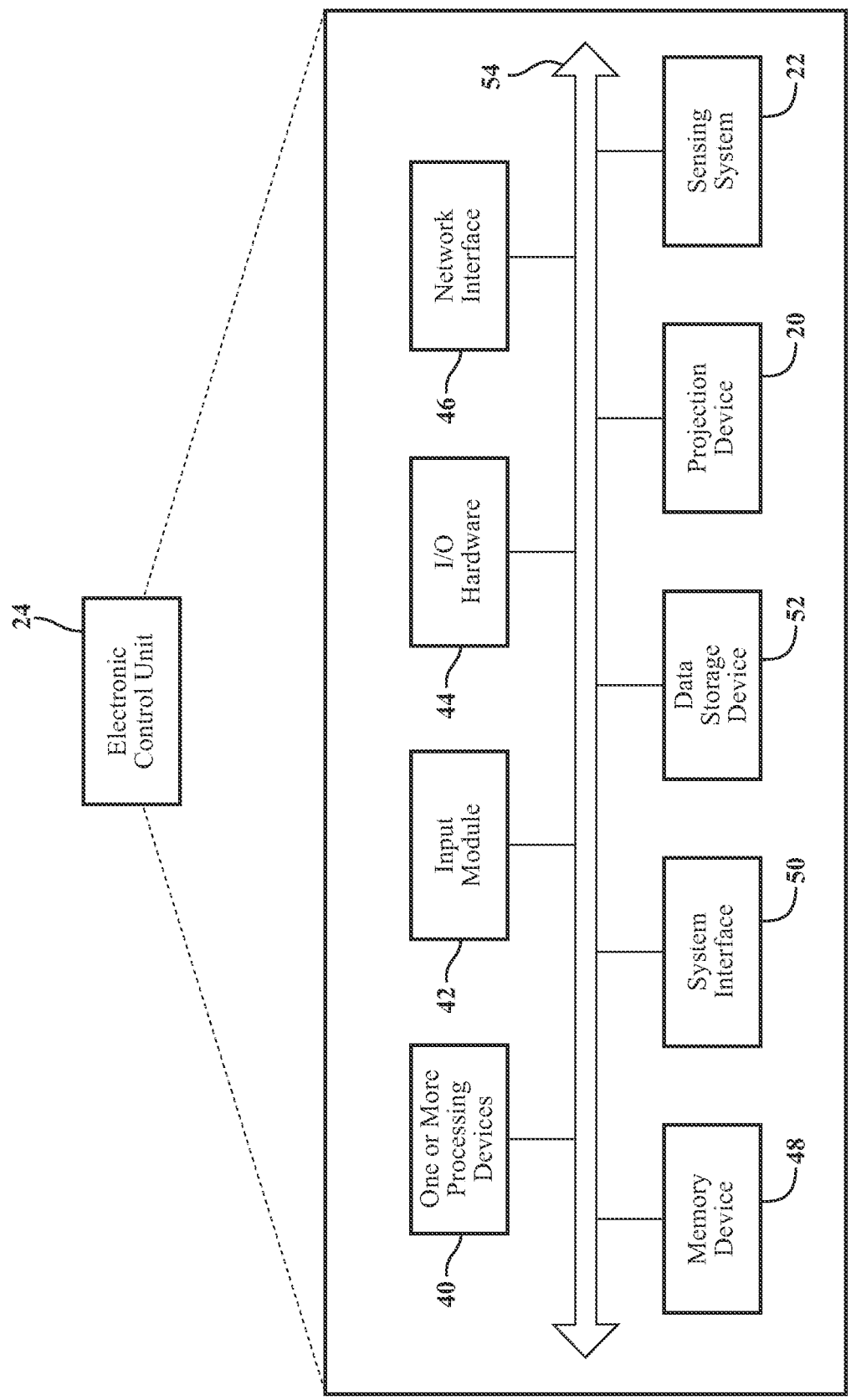
FIG. 4A schematically depicts illustrative hardware components of an electronic control unit that may be used in the steering wheel selective transparency system according to one or more embodiments shown and described herein.

Now referring to FIG. 4A, the illustrative hardware components of the electronic control unit 24 of the vehicle 10 that may be used in the steering wheel selective transparency system 14 is schematically depicted. While the components depicted in FIG. 4A are described with respect to the electronic control unit 24 of the vehicle 10, it should be understood that similar components may also be used in remote devices (e.g. a user-computing device, a server-computing device, and the like) communicatively coupled to the vehicle 10 and/or to the electronic control unit 24 via a network without departing from the scope of the present disclosure. For example, the network may a computer network that may include a wide area network (WAN), such as the Internet, a local area network (LAN), a mobile communications network, a public service telephone network (PSTN), a personal area network (PAN), a metropolitan area network (MAN), a virtual private network (VPN), and/or another network that may be a wired or wireless network.

The electronic control unit 24 may include a non-transitory computer-readable medium for completing the various processes described herein, embodied as hardware, software, and/or firmware, according to embodiments shown and described herein. While in some embodiments the electronic control unit 24 may be configured as a general purpose computer with the requisite hardware, software, and/or firmware, in other embodiments, the electronic control unit 24 may also be configured as a special purpose computer designed specifically for performing the functionality described herein. For example, the electronic control unit 24 may be a device that is particularly adapted to automatically project the plurality of display data 21 onto the exterior surface 19a of the steering wheel when a desirable notification 35 for the driver to view is occluded or otherwise blocked by the position of the steering wheel 18 and/or by the arms 36, and/or by the hands 38 of the driver such that the driver is alerted to the desirable notification.

In another example, the electronic control unit 24 may be a device that is particularly adapted to utilize the sensing system 22 of the steering wheel selective transparency system 14 of the vehicle 10 for the purposes of monitoring the gaze of the driver, vehicle conditions, and the like, to determine when to display the plurality of display data 21 onto the exterior surface 19a of the steering wheel 18 and when to remove it (e.g., stop projecting) after the driver has looked at or seen the desirable notification 35. In embodiments where the electronic control unit 24 is a general purpose computer, the systems and methods described herein provide a mechanism for improving functionality by providing a visual display of the occluded or otherwise blocked notifications or urgent messages and because such as display is for a discrete period of time, such as display is an alert to notify the driver of the urgent or desirable notification 35 and as such, an improvement in the visual display to the driver (e.g., vehicle occupant).

Still referring to FIG. 4A, the electronic control unit 24 may generally be an onboard vehicle computing system and, in some embodiments, the electronic control unit 24 may be a plurality of vehicle computing systems.

As also illustrated in FIG. 4A, the electronic control unit 24 may include one or more processing devices 40, an input module 42, an I/O hardware 44, a network interface hardware 46, a non-transitory memory device 48, a system interface 50, and a data storage device 52. A local interface 54, such as a bus or the like, may interconnect the various components such as the components of the steering wheel selective transparency system 14 (e.g., the projection system 20 and the sensing system 22) to the electronic control unit 24.

The one or more processing devices 40, such as a computer processing unit (CPU), may be the central processing unit of the electronic control unit 24, performing calculations and logic operations to execute a program. The one or more processing devices 40, alone or in conjunction with the other components, is an illustrative processing device, computing device, or combination thereof. The one or more processing devices 40 may include any processing component configured to receive and execute instructions (such as from the data storage device 52 and/or the memory device 48).

The memory device 48 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory device 48 may include one or more programming instructions thereon that, when executed by the one or more processing devices 40, cause the one or more processing devices 40 to complete various processes, such as the processes described herein with respect to FIG. 5. Still referring to FIG. 4A, the programming instructions stored on the memory device 48 may be embodied as a plurality of software logic modules, where each logic module provides programming instructions for completing one or more tasks, as described in greater detail below with respect to FIG. 4B.

The network interface hardware 46 may include any wired or wireless networking hardware, such as a modem, a LAN port, a wireless fidelity (Wi-Fi) card, WiMax card, mobile communications hardware, and/or other hardware for communicating with other networks and/or devices. For example, the network interface hardware 46 may provide a communications link between the vehicle 10 and other remote components such as the user-facing computing device, the server-computing device, and the like.

Still referring to FIG. 4A, the data storage device 52, which may generally be a storage medium, may contain one or more data repositories for storing data that is received and/or generated. The data storage device 52 may be any physical storage medium, including, but not limited to, a hard disk drive (HDD), memory, removable storage, and/or the like. While the data storage device 52 is depicted as a local device, it should be understood that the data storage device 52 may be a remote storage device, such as, for example, a server-computing device or the like. Illustrative data that may be contained within the data storage device 52 is described below with respect to FIG. 4C.

Still referring to FIG. 4A, the input module 42 may include tactile input hardware (i.e. a joystick, a knob, a lever, a button, etc.) that allows the vehicle occupant to input settings such as various notifications that should be displayed on the steering wheel 18, whether to only consider occlusion by the steering wheel 18 or includes the hands of the driver, sensitivity or an amount of occlusion time for display (e.g., in a non-limiting range from 5 milliseconds to 1 second), and/or the like. In some embodiments, a button or other electrically coupled input device may be disposed within the vehicle 10 and may be communicatively coupled to the steering wheel selective transparency system 14 (FIG. 1) such that when the button or other input device is activated (i.e., touched, moved, etc.), the one or more processing devices 40 executes logic stored on the memory device 48 to activate the steering wheel selective transparency system 14. It should be appreciated that the input device may be a keyboard, a mouse, a joystick, a touch screen, a remote control, a pointing device, a video input device, an audio input device, a haptic feedback device, and/or the like.

The I/O hardware 44 may communicate information between the local interface 54 and one or more other components of the vehicle 10. For example, the I/O hardware 44 may act as an interface between the electronic control unit 24 and other components, such as navigation systems, meter units, head-up display units, mobile phone systems, infotainment systems, and/or the like. In some embodiments, the I/O hardware 44 may be utilized to transmit one or more commands to the other components of the vehicle 10.

The network interface hardware 46 may include any wired or wireless networking hardware, such as a modem, a LAN port, a wireless fidelity (Wi-Fi) card, WiMax card, mobile communications hardware, and/or other hardware for communicating with other networks and/or devices. For example, the network interface hardware 46 may provide a communications link between the vehicle 10 and the other components of the steering wheel selective transparency system 14 and/or other remote devices.

The system interface 50 may generally provide the electronic control unit 24 with an ability to interface with one or more external devices such as, for example, components of the projection system 20, the sensing system 22 and/or the like. Communication with external devices may occur using various communication ports (not shown). An illustrative communication port may be attached to a communications network.

The sensing system 22 may be communicatively coupled to the local interface 54 and coupled to the one or more processing devices 40 via the local interface 54 and/or the system interface 50. The sensing system 22 may permit data gathered from the at least one sensor 26 configured for sensing the position of the steering wheel 18 and/or position of the arms 36 and/or hands 38 of the driver positioned on the steering wheel 18, the at least one sensor 28 configured for sensing the plurality of display data 21 displayed on the meter unit 33 and/or the head-up display, and the at least one sensor 30 configured to determine the gaze of the driver, and/or the like to be communicated to the one or more processing devices 40.

With reference to FIG. 4B, in some embodiments, the program instructions contained on the memory device 48 may be embodied as a plurality of software modules, where each module provides programming instructions for completing one or more tasks. For example, FIG. 4B schematically depicts the memory device 48 containing illustrative logic components according to one or more embodiments shown and described herein. As shown in FIG. 4B, the memory device 48 may be configured to store various processing logic, such as, for example, operating logic 60, projection logic 62, sensing logic 64, vehicle conditions logic 66, and/or steering wheel position logic 68 (each of which may be embodied as a computer program, firmware, or hardware, as an example). The operating logic 60 may include an operating system and/or other software for managing components of the electronic control unit 24 (FIG.

4A). Further, the operating logic 60 may contain one or more software modules for receiving data, transmitting data, and/or analyzing data.

Still referring to FIG. 4B, the projection logic 62 may contain one or more software modules for collecting data from one or more sources (i.e. data from the at least one sensor 28 configured for sensing the plurality of display data 21 displayed on the meter unit 33 and/or the head-up display) and/or converting data into a display, such as the projected images onto the projected surface of the exterior surface 19*a* of the steering wheel 18, that mirrors the display data 21 that is blocked or occlude from a field of view of the driver by the steering wheel 18 and/or the arms 36 and/or hands 38 of the driver, as described in greater detail herein. As such, the projection logic 62 may, along with other software modules of the memory device 48 (e.g., the operating logic 60, the sensing logic 64, the vehicle conditions logic 66, and/or the steering wheel position logic 68) determine when the desirable notification 35 is blocked or occluded from the view of the driver by the steering wheel 18 and/or the arms 36, and/or hands 38 of the driver, and project the desirable notification 35 onto the projection surface of the exterior surface 19*a* of the steering wheel 18, as discussed in greater detail herein.

The sensing logic 64 may contain one or more software modules for operating, communicating with, analyzing data, and gathering data from the sensing system 22 (e.g., the at least one sensor 26 configured for sensing the position of the steering wheel 18 and/or position of the arms 36 and/or hands 38 of the driver positioned on the steering wheel 18, the at least one sensor 28 configured for sensing the plurality of display data 21 displayed on the meter unit and/or the head-up display, and the at least one sensor 30 configured to determine the gaze of the driver). The sensing logic 64 may analyze the image data to determine the desirable notification to project onto the projection surface of the exterior surface 19*a* of the steering wheel 18. Further, the sensing logic 64 may analyze the image data to determine whether or not the driver has view the projected image data via gaze sensing such that the projected image may be continued to be displayed until the driver recognizes the desirable notification projected onto the exterior surface 19*a* of the steering wheel 18.

The vehicle conditions logic 66 may contain one or more software modules for determining when the desirable notification 35 is required to alert the driver of desirable information regarding the vehicle 10 (FIGS. 3A-3B) and/or surroundings of the vehicle 10 (FIG. 1). For example, when an urgent and/or important notifications produced by the components of the vehicle 10 (FIG. 1) is required, and/or as sensed by the at least one sensor 31 (FIG. 1) for monitoring vehicle conditions and analyzed by the electronic control unit 24 (FIG. 4A). As such, the desirable notification 35 may include, without limitation, notifications that may alert the driver, require an action by the driver, require immediate attention by the driver such as an urgent notification, and/or the like.

The steering wheel position logic 68 may contain one or more software modules analyzing data from sensing a position of the steering wheel 18, components thereof (e.g., wheel itself, spokes, airbag, horn button, and the like) and determining whether or not the desirable notification 35 is occluded or blocked from the field of view of the driver. Further, the steering wheel position logic 68 may analyze data to determine whether or not the arms 36 and/or hands 38 of the driver block or occlude the desirable notification 35 from the field of view of the driver. Additionally, the steering wheel position logic 68 may determine the position of the arms 36 and/or hands 38 of the driver such that the projected images are displayed around the arms 36 and/or hands 38 of the driver, as best illustrated in FIGS. 3B-3C and/or such that the hands of the driver are not covered by the projected images. In other embodiments, the steering wheel position logic 68 may determine the position of the arms 36 and/or hands 38 of the driver such that the projected images are displayed onto the arms 36 and/or hands 38 of the driver.

FIG. 4C schematically depicts a block diagram of various data contained within a storage device (e.g., the data storage device 52). As shown in FIG. 4C, the data storage device 52 may include, for example, display images data 70, such as the desirable notification 35, the images of the meter unit 33, and the like, that is displayed onto the projection surface of the exterior surface 19*a* of the steering wheel 18 to make the steering wheel 18 selectively transparent. The data storage device 52 may further include, for example, a steering wheel data 72 such as the type, size, adjustment position, and the like, of the steering wheel 18, as discussed in greater detail herein.

The data storage device 52 further includes a plurality of sensor data 74, such as data acquired from the sensing system 22. For instance, the plurality of sensor data 74 may include data from the at least one sensor 26 configured for sensing the position of the steering wheel 18 and/or position of the arms 36 and/or hands 38 of the driver positioned on the steering wheel 18, the at least one sensor 28 configured for sensing the plurality of display data 21 displayed on the meter unit 33 and/or the head-up display, and the at least one sensor 30 configured to determine the gaze of the driver and store the gaze data. As such, the current position of the steering wheel 18, the positon of the arms 36 and/or hands 38 of the driver, the gaze data, and the like, may be stored and continuously updated in the plurality of sensor data 74.

The data storage device 52 further includes a hand data 76, such as data received by vehicle components and sensors, for example, the at least one sensor 26 of the sensing system 22, and the like, to store current position of the arms 36 and/or hands 38 of the driver on the steering wheel 18, size of the hand, tendencies of the placement of the of the arms 36 and/or hands 38 with respect to the steering wheel 18 during particular driving maneuvers, such as turning left or right, driving on straight trajectories, and the like.

The data storage device 52 further includes a vehicle operating conditions data 78, such as data received by vehicle components and sensors, the at least one sensor 31 of the sensing system 22, and the like, to store when the desirable notification 35 is displayed for the driver on the meter unit 33, the head-up display, and the like. As such, the notification itself may be stored in the vehicle operating conditions data 78 along with other vehicle operations data.

It should be understood that the components illustrated in FIGS. 4A-4C are merely illustrative and are not intended to limit the scope of this disclosure. More specifically, while the components in FIGS. 4A-4C are illustrated as residing within the electronic control unit 24 of the vehicle 10, this is a non-limiting example. In some embodiments, one or more of the components may reside external to the electronic control unit 24 and/or the vehicle 10. Similarly, as previously described herein, while FIGS. 4A-4C are directed to the electronic control unit 24 of the vehicle 10, other components such as a user-computing device, a personal electronic device, a server-computing device, and the like, may be implemented and may include similar hardware, software, and/or firmware to carry out the functionality described herein.

As mentioned above, the various components described with respect to FIGS. 4A-4C may be used to carry out one or more processes and/or produce data that can improve a user interface with the vehicle by displaying a limited set of data related to the desirable notifications onto the exterior surface 19a of the steering wheel 18 when the displayed data of the meter unit 33 and/or head-up display is blocked or occluded form the field of view of the driver.

Figure 5:
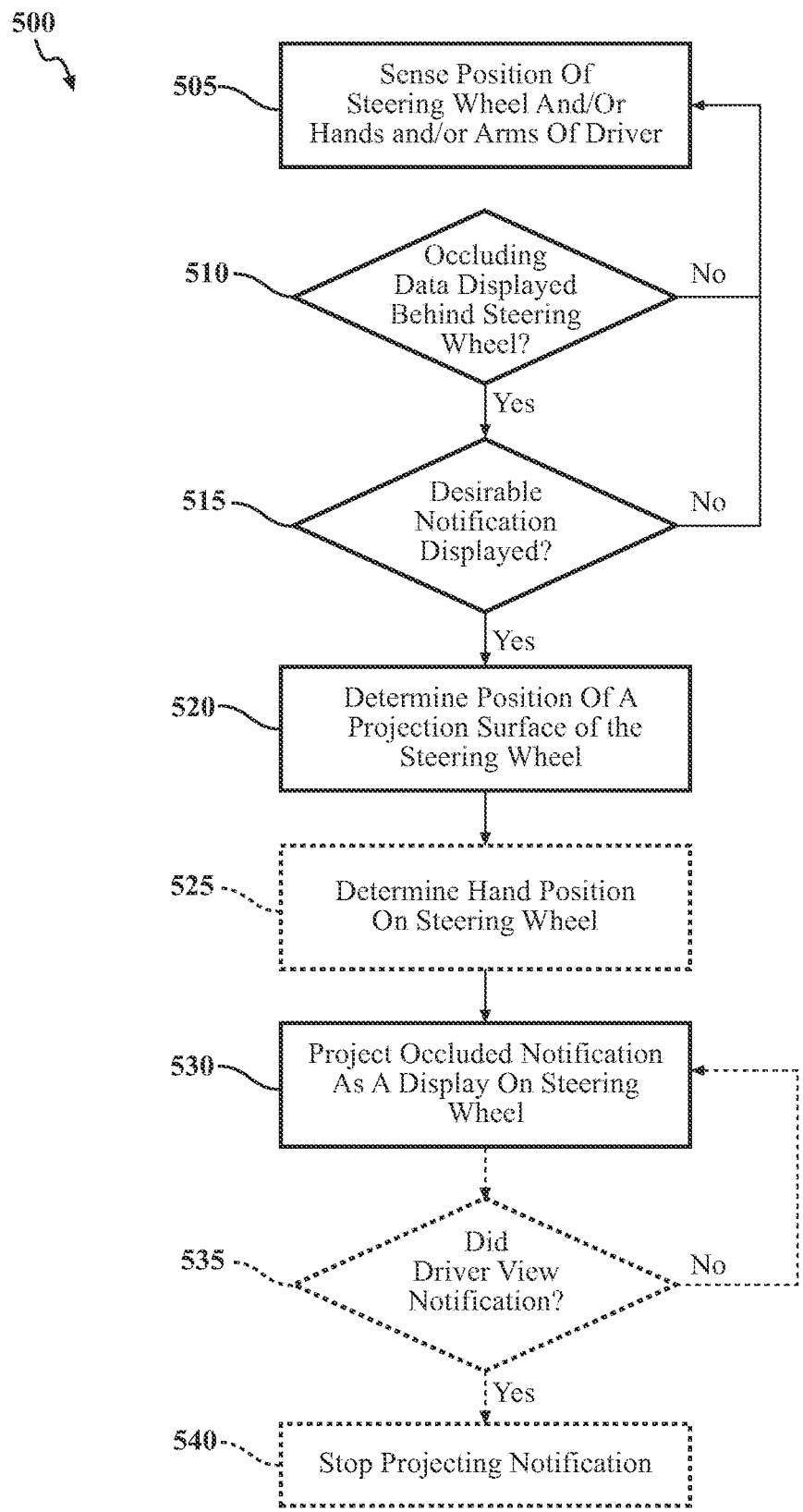
FIG. 5 depicts a flow diagram of an illustrative method of determining whether to selectively project images onto the steering wheel to display desirable notifications to the driver while selectively making the steering wheel transparent according to one or more embodiments shown and described herein.

Now referring back to FIGS. 1-2 and 3A-3C, and also now to FIG. 5, a flow diagram of an illustrative method 500 for determining whether to selectively project images onto the steering wheel to display desirable notifications to the driver while selectively making the steering wheel transparent is depicted. Although the steps associated with the blocks of FIG. 5 will be described as being separate tasks, in other embodiments, the blocks may be combined or omitted. Further, while the steps associated with the blocks of FIG. 5 will described as being performed in a particular order, in other embodiments, the steps may be performed in a different order.

At block 505, the position of the steering wheel 18 and/or the arms 36, and/or hands 38 of the driver are sensed. The position of the steering wheel and/or hands of the driver may be determined by the sensing system 22. For example, the at least one sensor 26 of the sensing system 22 may be configured for sensing the position of the steering wheel 18 and/or position of the arms 36 and/or hands 38 of the driver positioned on the steering wheel 18. At block 510, a determination is made regarding whether the position of the steering wheel 18 and/or the arms 36, and/or hands 38 of the driver are occluding or blocking from view of the driver the display data 21 and/or desirable notification 35 displayed on the meter unit 33 and/or head-up display positioned behind the steering wheel 18. When it is determined that the position of the steering wheel 18 and/or the arms 36, and/or hands 38 of the driver are not occluding or blocking from view of the driver the display data 21 and/or desirable notification 35 displayed on the meter unit 33 and/or head-up display positioned behind the steering wheel 18, then the method 500 returns to block 505 to sense the position of the steering wheel 18 and/or the arms 36, and/or hands 38 of the driver. It should be understood that the flow between blocks 505-510 and back to block 505 may continuously loop until a determination is made that the position of the steering wheel 18 and/or hands of the driver are occluding or blocking from view of the driver the display data 21 and/or desirable notification 35 displayed on the meter unit and/or head-up display positioned behind the steering wheel 18, at block 510.

When it is determined that the position of the steering wheel 18 and/or the arms 36 and/or hands 38 of the driver are occluding or blocking from view of the driver the display data 21 and/or desirable notification 35 displayed on the meter unit 33 and/or head-up display positioned behind the steering wheel 18, then, at block 515, a determination is made whether the desirable notification 35 or message is currently displayed on the meter unit 33 and/or head-up display positioned behind the steering wheel 18. The desirable notification 35 may be an important or urgent message.

When it is determined that the desirable notification 35 is not currently displayed on the meter unit 33 and/or head-up display positioned behind the steering wheel 18, then the method 500 returns to block 505 to sense the position of the steering wheel 18 and/or the arms 36, and/or hands 38 of the driver. It should be understood that the flow between blocks 505-515 and back to block 505 may continuously loop until a determination is made that the position of the steering wheel 18 and/or the arms 36, and/or hands 38 of the driver are occluding or blocking from view of the driver the desirable notification 35 currently displayed on the meter unit and/or head-up display positioned behind the steering wheel 18, at block 515.

When it is determined that the desirable notification 35 is currently displayed on the meter unit 33 and/or head-up display positioned behind the steering wheel 18, then, at block 520, the position of the projection surface (e.g., exterior surface 19a) of the steering wheel 18 is determined, and optionally, at block 525, the position of the arms 36 and/or hands 38 of the driver are determined. At block 530, the desirable notification 35 is projected for display onto the projection surface of the steering wheel 18 by the projection system 20. Further, in some embodiments, other data is projected onto the projection surface of the steering wheel 18 by the projection system 20. For example, the display data 21 of the meter unit 33 or head-up display is also projected onto the projection surface of the steering wheel 18 by the projection system 20.

As such, the steering wheel selective transparency system 14 selectively chooses when to display the desirable notification 35 onto the projection surface of the steering wheel 18. Such selectively also serves as an alert to the driver that when the projection occurs, there is the desirable notification 35 requiring the driver to divert attention to review the desirable message.

Further, in some embodiments, the display of the desirable notification 35 projected for display onto the projection surface of the steering wheel 18 fully covers the exterior surface 19a of the steering wheel 18. In other embodiments, the display of the desirable notification 35 projected for display onto the projection surface of the steering wheel 18 is projected to avoid the sensed position of the hands 38 of the driver such that the driver can still see the location of their hands 38 onto the steering wheel 18, as depicted in FIG. 3C. In other embodiments, the display of the desirable notification 35 projected for display onto the projection surface of the steering wheel 18 is projected onto the arms 36 and/or hands 38 of the driver.

In some embodiments, optionally, at block 535, the sensing system 22 determines whether the driver has viewed the desirable notification 35 projected for display onto the projection surface of the steering wheel 18. For example, the at least one sensor 30 may determine whether the driver has viewed the desirable notification 35 projected for display onto the projection surface of the steering wheel 18. In some embodiments, the gaze determination may be whether the driver has glanced or looked at the projected image. In other embodiments, the gaze of the driver may be analyzed to determine whether the gaze at the projected image exceeds a predetermined amount of time threshold and/or whether the gaze of the driver at the projected image is a reengagement exceeding a predetermined number of times that a gaze of the driver returns to the projected image, as discussed in greater detail herein. If the driver has not viewed the desirable notification 35 projected for display onto the projection surface of the steering wheel 18, then the desirable notification 35 will continue to be displayed, at block 530. In some embodiments, an audio alarm or other alert may be presented to alert the driver to view the desirable notification 35.

It should be understood that, in this embodiment, the flow between blocks 530-535 and back to block 530 may continuously loop until a determination is made that the driver has viewed the desirable notification 35 projected onto the projection surface of the steering wheel 18. It should be understood that in other embodiments, the driver may acknowledge viewing the desirable notification 35 by a button, by audio commands, and the like, other than by gaze sensing. Once the driver has viewed the desirable notification 35, then, at block 540, the projector stops displaying the desirable notification 35 and the steering wheel 18 no longer appears to be transparent to the driver.

It should be appreciated that the processes described with respect to FIG. 5 are arranged as a continuous loop.

It should now be understood that the systems and methods described herein may function to selectively make the steering wheel transparent to the view of the driver by displaying desirable messages onto the steering wheel that would otherwise be occluded or block from the field of view of the driver by the steering wheel and/or hands of the driver.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It is claimed:

1. A steering wheel selective transparency system for a vehicle, the vehicle including a passenger compartment, a steering wheel having a projection surface, and a plurality of display data displayed on a display device positioned behind the steering wheel, the system comprising:
    a sensor system positioned in the passenger compartment;
    a projection system positioned in the passenger compartment, and
    an electronic control unit communicatively coupled to the sensor system and the projection system, the electronic control unit including at least one processing device and a memory device coupled to the at least one processing device, the memory device stores logic that, when executed by the at least one processing device, causes the electronic control unit to:
        determine when the plurality of display data displayed on the display device behind the steering wheel is blocked by the steering wheel from a field of view of a driver,
        determine when a desirable notification is included in the plurality of display data displayed on the display device, and
        when the desirable notification is included in the plurality of display data displayed on the display device and the field of view of the desirable notification for the driver is blocked by the steering wheel, control the projection system to project the desirable notification onto the projection surface of the steering wheel that fully covers the steering wheel such that the steering wheel appears to be transparent to the driver when the desirable notification is displayed onto the projection surface.

2. The steering wheel selective transparency system of claim 1, wherein the sensor system further comprises:
    at least one sensor configured for sensing a position of the steering wheel,
    wherein the electronic control unit is further configured to:
        determine when the plurality of display data displayed on the display device behind the steering wheel is blocked by the steering wheel from the field of view of the driver by the sensed position of the steering wheel, and
        control the projection system.

3. The steering wheel selective transparency system of claim 2, wherein:
    the at least one sensor is configured for sensing a position of a pair of hands of the driver positioned on the steering wheel,
    wherein the electronic control unit is further configured to:
        determine when the plurality of display data displayed on the display device behind the steering wheel is blocked by the sensed position of the pair of hands of the driver on the steering wheel, and
        control the projection system.

4. The steering wheel selective transparency system of claim 1, wherein the sensor system further comprises:
    at least one sensor configured for sensing the plurality of display data displayed on the display device,
    wherein the electronic control unit is further configured to:
        control the projection system to project at least a portion of the plurality of display data onto the projection surface of the steering wheel.

5. The steering wheel selective transparency system of claim 1, wherein the sensor system further comprises:
    at least one sensor configured to determine a gaze of the driver to sense and output a gaze data,
    wherein the electronic control unit is further configured to:
        determine whether the driver has viewed the desirable notification based on the gaze data,
        in response to determining that the driver has viewed the desirable notification projected onto the projection surface of the steering wheel, control the projection system to end the projection of the desirable notification onto the projection surface of the steering wheel.

6. The steering wheel selective transparency system of claim 5, wherein the determination that the driver has viewed the desirable notification projected onto the projection surface of the steering wheel is determined when the gaze of the driver viewed the desirable notification for a predetermined amount of time.

7. The steering wheel selective transparency system of claim 5, wherein the determination that the driver has viewed the desirable notification projected onto the projection surface of the steering wheel is determined by a reengagement exceeding a predetermined number of times that the gaze of the driver returns to the desirable notification.

8. The steering wheel selective transparency system of claim 1, wherein the projection surface includes a portion of the driver positioned adjacent to or in contact with the steering wheel.

9. A method of selectively making a steering wheel transparent, the method comprising the steps of:
    determining, by an electronic control unit, when a plurality of display data displayed on a display device behind the steering wheel is blocked by the steering wheel from a field of view of a driver;
    determining, by the electronic control unit, when a desirable notification is included in the plurality of display data displayed on the display device; and
    when the desirable notification is included in the plurality of display data displayed on the display device and the field of view of the desirable notification for the driver is blocked by the steering wheel, controlling, by the electronic control unit, a projection system to project the desirable notification onto a projection surface of the steering wheel that fully covers the steering wheel such that the steering wheel appears to be transparent when the desirable notification is displayed onto the projection surface.

10. The method of claim 9, wherein the step of determining when the plurality of display data displayed on the display device behind the steering wheel is blocked by the steering wheel from the field of view of the driver is sensed by a sensor system positioned within a passenger compartment of a vehicle.

11. The method of claim 10, wherein the sensor system further comprises at least one sensor configured for sensing a position of the steering wheel.

12. The method of claim 10, wherein the sensor system further comprises at least one sensor configured for sensing a position of a pair of hands of the driver positioned on the steering wheel.

13. The method of claim 12, further comprising the steps of:
 determining, by the electronic control unit, when the plurality of display data displayed on the display device behind the steering wheel is blocked by the sensed position of the pair of hands of the driver on the steering wheel, and
 when the sensed position of the pair of hands of the driver on the steering wheel block or occluded the desirable notification, controlling, by the electronic control unit, the projection system to project the desirable notification onto the projection surface of the steering wheel that fully covers the steering wheel such that the steering wheel appears to be transparent when the desirable notification is displayed onto the projection surface.

14. The method of claim 10, wherein the sensor system further comprises at least one sensor configured for sensing a gaze of the driver.

15. The method of claim 14, further comprising the steps of:
 determining, by the electronic control unit, whether the driver has viewed the desirable notification based on sensed data from the at least one sensor,
 in response to determining that the driver has viewed the desirable notification projected onto the projection surface of the steering wheel, controlling, by the electronic control unit, the projection system to end the projection of the desirable notification onto the projection surface of the steering wheel.

16. The method of claim 15, wherein the determination that the driver has viewed the desirable notification projected onto the projection surface of the steering wheel is determined when the gaze of the driver viewed the desirable notification for a predetermined amount of time.

17. The method of claim 15, wherein the determination that the driver has viewed the desirable notification projected onto the projection surface of the steering wheel is determined by a reengagement exceeding a predetermined number of times that the gaze of the driver returns to the desirable notification.

18. A steering wheel selective transparency system for a vehicle comprising:
 a steering wheel having a projection surface;
 a plurality of display data displayed on a display device positioned behind the steering wheel;
 a sensor system having:
  at least one first sensor configured for sensing a position of the steering wheel, and
  at least one second sensor configured for sensing the plurality of display data displayed on the display device;
 a projection system; and
 an electronic control unit communicatively coupled to the sensor system and the projection system, the electronic control unit configured to:
  determine when the plurality of display data displayed on the display device behind the steering wheel is blocked by the position of the steering wheel from a field of view of a driver sensed by the at least one first sensor,
  determine when a desirable notification is included in the plurality of display data displayed on the display device, and
  when the desirable notification is included in the plurality of display data displayed on the display device and the field of view of the desirable notification for the driver is blocked by the steering wheel, control the projection system to project the desirable notification, sensed by the at least one second sensor, onto the projection surface of the steering wheel that fully covers the steering wheel such that the steering wheel appears to be transparent to the driver when the desirable notification is displayed onto the projection surface.

19. The steering wheel selective transparency system of claim 18, wherein the sensor system further comprises:
 at least one third sensor configured to determine a gaze of the driver to sense and output a gaze data,
 wherein the electronic control unit is further configured to:
  determine whether the driver has viewed the desirable notification based on the gaze data,
  in response to determining that the driver has viewed the desirable notification projected onto the projection surface of the steering wheel, control the projection system to end the projection of the desirable notification onto the projection surface of the steering wheel.

20. The steering wheel selective transparency system of claim 19, wherein:
 the determination that the driver has viewed the desirable notification projected onto the projection surface of the steering wheel is determined when the gaze of the driver viewed the desirable notification for a predetermined amount of time, or
 the determination that the driver has viewed the desirable notification projected onto the projection surface of the steering wheel is determined by a reengagement exceeding a predetermined number of times that the gaze of the driver returns to the desirable notification.

* * * * *

UNITED STATES PATENT AND TRADEMARK OFFICE
CERTIFICATE OF CORRECTION

PATENT NO. : 11,975,609 B1
APPLICATION NO. : 18/144439
DATED : May 7, 2024
INVENTOR(S) : Benjamin Piya Austin et al.

It is certified that error appears in the above-identified patent and that said Letters Patent is hereby corrected as shown below:

On the Title Page

Item (73), assignee 2, address, delete "Toyota" and insert --Toyota-shi, Aichi-ken--, therefor.

In the Specification

In Column 14, Line(s) 33, delete "positon" and insert --position--, therefor.

Signed and Sealed this
Eighteenth Day of June, 2024

Katherine Kelly Vidal
*Director of the United States Patent and Trademark Office*